(12) United States Patent
Yang

(10) Patent No.: US 12,203,612 B2
(45) Date of Patent: Jan. 21, 2025

(54) LINE LIGHT EMITTING LAMP STRING

(71) Applicant: Jianbao Yang, Guangdong (CN)

(72) Inventor: Jianbao Yang, Guangdong (CN)

( * ) Notice: Subject to any disclaimer, the term of this patent is extended or adjusted under 35 U.S.C. 154(b) by 93 days.

(21) Appl. No.: 18/162,907

(22) Filed: Feb. 1, 2023

(65) Prior Publication Data

US 2024/0167647 A1    May 23, 2024

(30) Foreign Application Priority Data

Nov. 17, 2022  (CN) .......................... 202223060911.2

(51) Int. Cl.
*F21S 4/22*    (2016.01)
*F21S 4/10*    (2016.01)
*F21V 23/00*   (2015.01)

(52) U.S. Cl.
CPC . *F21S 4/22* (2016.01); *F21S 4/10* (2016.01); *F21V 23/001* (2013.01)

(58) Field of Classification Search
CPC ........ F21S 4/10; F21S 4/15; F21S 4/20; F21S 4/22; F21S 4/24; F21S 4/26; F21S 4/28; F21V 23/001
See application file for complete search history.

(56) References Cited

U.S. PATENT DOCUMENTS

| | | | | |
|---|---|---|---|---|
| 10,876,689 B1* | 12/2020 | Bowser | ...................... | F21V 9/30 |
| 2002/0106931 A1* | 8/2002 | Hsien-Te | ................ | F21V 31/00 |
| | | | | 439/490 |
| 2006/0133064 A1* | 6/2006 | Lin | ........................ | F21S 10/002 |
| | | | | 362/101 |
| 2012/0275157 A1* | 11/2012 | Hsu | ........................... | F21S 4/22 |
| | | | | 362/249.14 |
| 2015/0062899 A1* | 3/2015 | Yang | ................... | F21V 33/0052 |
| | | | | 362/249.02 |
| 2015/0377428 A1* | 12/2015 | Chen | ........................ | F21V 9/38 |
| | | | | 264/21 |
| 2016/0341408 A1* | 11/2016 | Altamura | ............... | F21V 19/001 |
| 2019/0186716 A1* | 6/2019 | Meyer | ...................... | G09F 13/00 |
| 2019/0376669 A1* | 12/2019 | Shao | ...................... | F21V 19/005 |
| 2020/0284407 A1* | 9/2020 | Li | ........................... | H05K 1/181 |
| 2021/0156530 A1* | 5/2021 | Huang | ....................... | F21V 1/12 |
| 2021/0239284 A1* | 8/2021 | Jeong | ...................... | F21S 9/032 |

* cited by examiner

*Primary Examiner* — Jong-Suk (James) Lee
*Assistant Examiner* — James M Endo
(74) *Attorney, Agent, or Firm* — Leason Ellis LLP

(57) ABSTRACT

A line light emitting lamp string is disclosed, including a flexible light transmitting insulation pipe; a power supply line group arranged in the flexible light transmitting insulation pipe; at least one connecting piece connected with the flexible light transmitting insulation pipe, the connecting piece being provided with a conductive portion, and the conductive portion being electrically connected with the power supply line group; a lamp body detachably connected with the connecting piece so that the lamp body is electrically connected with the conductive portion; and at least one light emitting device arranged in the flexible light transmitting insulation pipe, the light emitting device being electrically connected with the power supply line group.

9 Claims, 4 Drawing Sheets

LINE LIGHT EMITTING LAMP STRING

CROSS-REFERENCE TO RELATED APPLICATIONS

The present disclosure claims priority to and the benefit of Chinese Patent Application No. 202223060911.2 filed Nov. 17, 2022, the contents of which are incorporated herein by reference, in its entirety.

TECHNICAL FIELD

The present disclosure relates to the field of lamp strings, and in particular to a line light emitting lamp string.

BACKGROUND

A lamp string is generally used for decoration and light emitting and is often used in outdoor scenes. The lamp string can be flexibly bent and fixed according to an actually used scene, which is convenient to use. Such existing lamp strings generally include a power supply line, connectors connected with the power supply line and lamp holders correspondingly connected with the connectors. The power supply line can be flexibly bent, so that the connector can be conveniently fixed at a desired position. The lamp holder emits light to achieve decoration, light emitting and other effects. The existing lamp string has a lower density of luminous points, thus more connectors and lamp holders should be additionally provided in order to increase the density of the luminous points. However, the connectors and the lamp holders have high production cost and are large and heavy, so that using excessive connectors and lamp holders to increase the density of the luminous points will lead to such problems as increased cost and inconvenient use.

SUMMARY

The present disclosure aims at solving at least one of the technical problems in the existing technology. For this purpose, the present disclosure provides a line light emitting lamp string, which does not rely on excessive connectors and lamp holders to achieve an effect of increasing the density of luminous points, is conducive to reducing the cost and is flexible and convenient to be used.

The line light emitting lamp string according to an embodiment of the present disclosure includes a flexible light transmitting insulation pipe; a power supply line group arranged in the flexible light transmitting insulation pipe; at least one connecting piece connected with the flexible light transmitting insulation pipe, the connecting piece is provided with a conductive portion electrically connected with the power supply line group; a lamp body detachably connected with the connecting piece, the lamp body is electrically connected with the conductive portion; and at least one light emitting device arranged in the flexible light transmitting insulation pipe and electrically connected with the power supply line group.

The line light emitting lamp string according to an embodiment of the present disclosure at least has the following beneficial effects that: the connecting piece is connected with the flexible light transmitting insulation pipe, the conductive portion on the connecting piece is electrically connected with the power supply line group in the flexible light transmitting insulation pipe, the lamp body is connected with the connecting piece to enable the lamp body to electrically connect with the conductive portion so that the lamp body can obtain electric energy from the power supply line group to emit light, the lamp body is detachably connected with the connecting piece to be conveniently replaced and used, and thus it is conducive to maintain the lamp body or replace other lamp bodies with different light emitting effects. Meanwhile, as the light emitting device is arranged in the flexible light transmitting insulation pipe, the light emitting device is connected with the power supply line group to obtain electric energy. The flexible light transmitting insulation pipe has the characteristics of light transmission, so that when being energized the light emitting device and the lamp body can emit light together to achieve a line light emitting effect. Without additionally increasing the quantity of connectors and lamp bodies, the density of luminous points can be improved, which is conducive to reducing the cost and meeting the use demands.

According to some embodiments of the present disclosure, the light emitting device includes at least one LED lamp bead and a diffusion layer, the LED lamp bead is connected with the power supply line group, the LED lamp bead has a luminous surface covered by the diffusion layer, and the LED lamp bead and the diffusion layer are surrounded by the flexible light transmitting insulation pipe.

According to some embodiments of the present disclosure, the light emitting device includes two LED lamp beads, the two LED lamp beads have luminous surfaces arranged by facing away from each other, and the two LED lamp beads are surrounded by the diffusion layer.

According to some embodiments of the present disclosure, at least three connecting pieces are provided, and a plurality of light emitting devices are arranged between two adjacent connecting pieces, and the luminous pieces between the adjacent connecting pieces are arranged in an even way.

According to some embodiments of the present disclosure, the connecting piece includes a housing and a conductive piece, the housing is provided with an inner cavity, a first connecting hole, a second connecting hole and a lamp body connecting hole, the first connecting hole, second connecting hole and lamp body connecting hole are communicated with the inner cavity, the conductive piece is arranged in the inner cavity, the flexible light transmitting insulation pipe passes through the first connecting hole, the inner cavity and the second connecting hole, the housing has a wall surface forming the first connecting hole and a wall surface forming the second connecting hole, the wall surface forming the first connecting hole and the wall surface forming the second connecting hole are connected with the flexible light transmitting insulation pipe in a sealing way, the conductive piece is connected with the power supply line group, the conductive portion is arranged on the conductive piece, and the housing has a wall surface forming the lamp body connecting hole and detachably connected with the lamp body.

According to some embodiments of the present disclosure, the conductive piece includes a first splicing block, a second splicing block and a conductive threaded sleeve, the first splicing block and the second splicing block are located in the inner cavity, the first splicing block is detachably connected with the second splicing block to clamp the flexible light transmitting insulation pipe, the first splicing block or the second splicing block is provided with a conductive block connected with the power supply line group, the conductive threaded sleeve is connected with the wall surface forming the lamp body connecting hole, the lamp body is provided with a conductive contact point capable of abutting against the conductive block and a conductive threaded portion in threaded connection with the conductive threaded sleeve.

According to some embodiments of the present disclosure, a break-proof portion is arranged on the wall surface forming the first connecting hole and the second connecting hole, and the break-proof portion can be bent along with the flexible light transmitting insulation pipe.

According to some embodiments of the present disclosure, the break-proof portion includes at least two mutually parallel distortion grooves arranged on the housing.

According to some embodiments of the present disclosure, the housing is provided with an extending wire portion and a connector portion, the extending wire portion is provided with a hollow channel, the lamp body connecting hole is positioned above the connector portion, the hollow channel has one end communicated with the inner cavity and another end communicated with the lamp body connecting hole.

According to some embodiments of the present disclosure, the housing has a wall surface of facing away from the lamp body connecting hole and provided with a hanging hole thereon.

The additional aspects and advantages of the present disclosure will be given in part in the following description, and will become apparent in part from the following description, or will be learned through the practice of the present disclosure.

BRIEF DESCRIPTION OF THE DRAWINGS

The above and/or additional aspects and advantages of the present disclosure will be more apparent from the following description of the embodiments in conjunction with the accompanying drawings, where.

DETAILED DESCRIPTION

Figure 1:
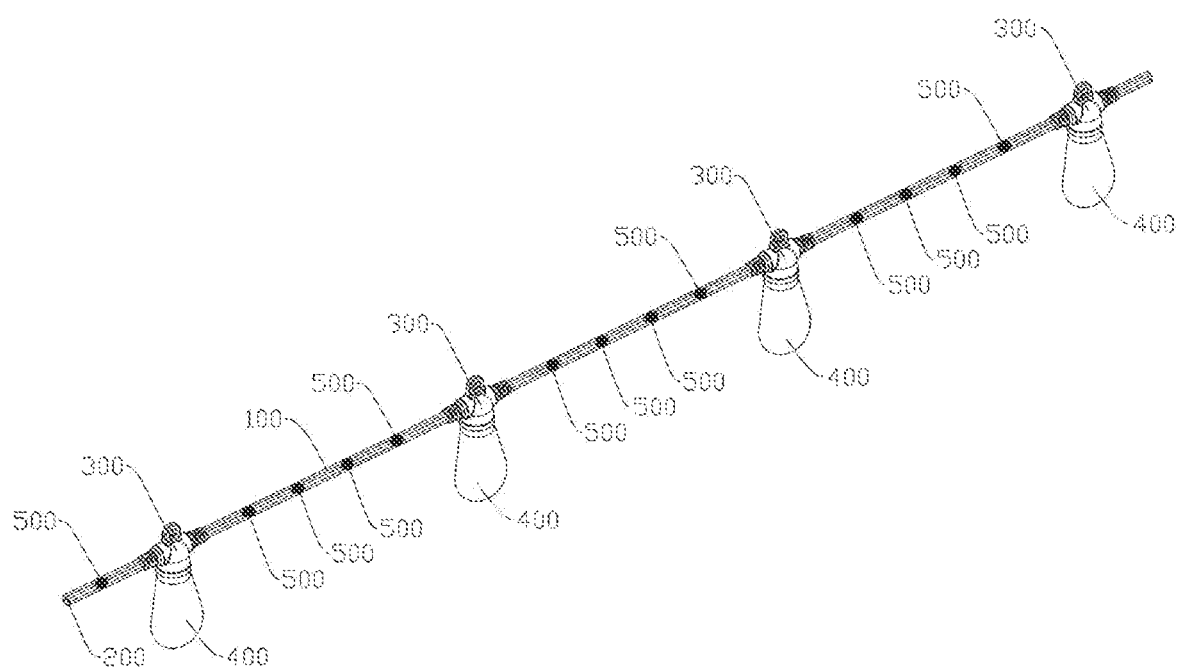
FIG. 1 is a stereoscopic schematic diagram in an embodiment of the present disclosure.

The embodiments of the present disclosure will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are only intended to explain the present disclosure, but should not be construed as limiting the present disclosure.

In the description of the present disclosure, it should be understood that the orientation or position relation related to the orientation description, such as the orientation or position relation indicated by the upper, lower, front, rear, left, right, etc., is based on the orientation or position relation shown in the drawings, which is only used for convenience of description of the present disclosure and simplification of description instead of indicating or implying that the indicated device or element must have a specific orientation, and be constructed and operated in a specific orientation, and thus shall not be understood as a limitation to the present disclosure.

In the description of the present disclosure, if "first" and "second" are described, the descriptions are used for the purpose of distinguishing the technical features only, and cannot be understood as indicating or implying relative importance, or implicitly indicating the number of technical features indicated thereby, or implicitly indicating the order of technical features indicated thereby.

In the description of the present disclosure, unless otherwise clearly defined, words such as setting, installation, connection, and the like, shall be understood broadly, and those skilled in the art can reasonably determine the specific meanings of the above words in the present disclosure in combination with the specific contents of the technical solution.

Figure 2:
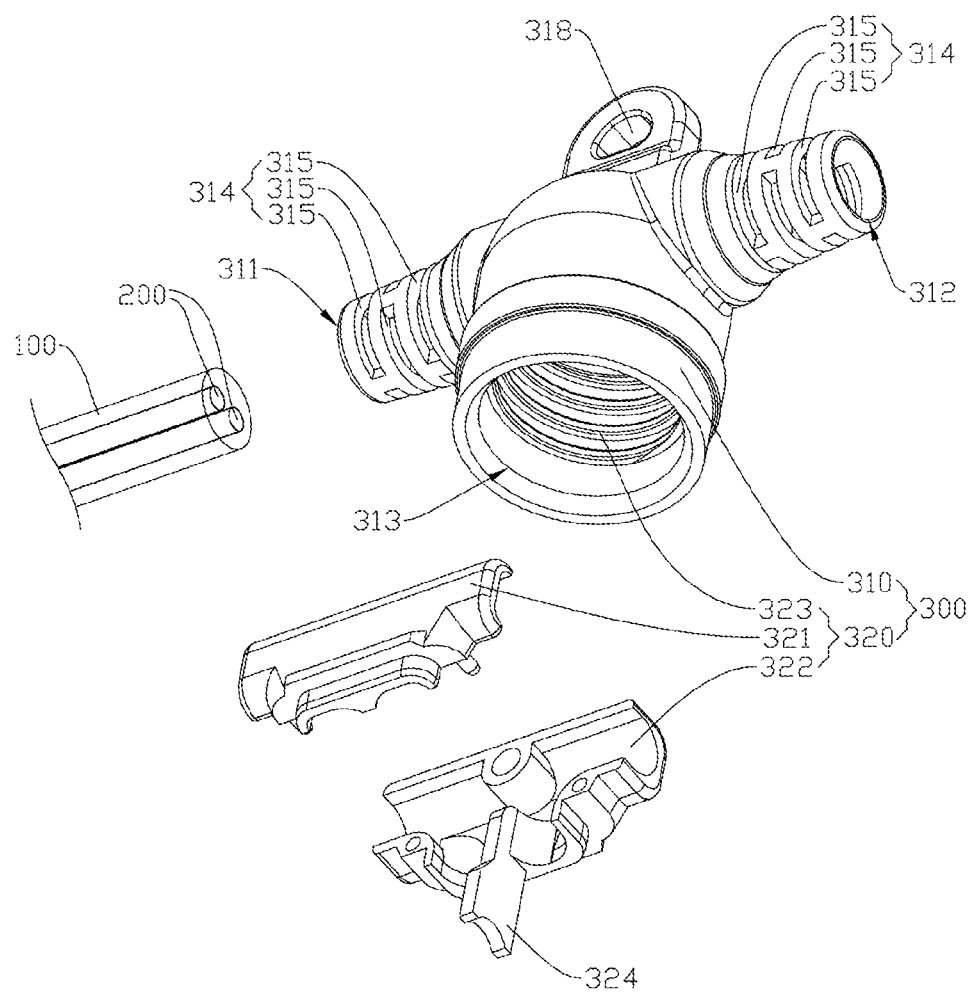
FIG. 2 is a stereoscopic decomposition schematic diagram in an embodiment of the present disclosure.
Figure 3:
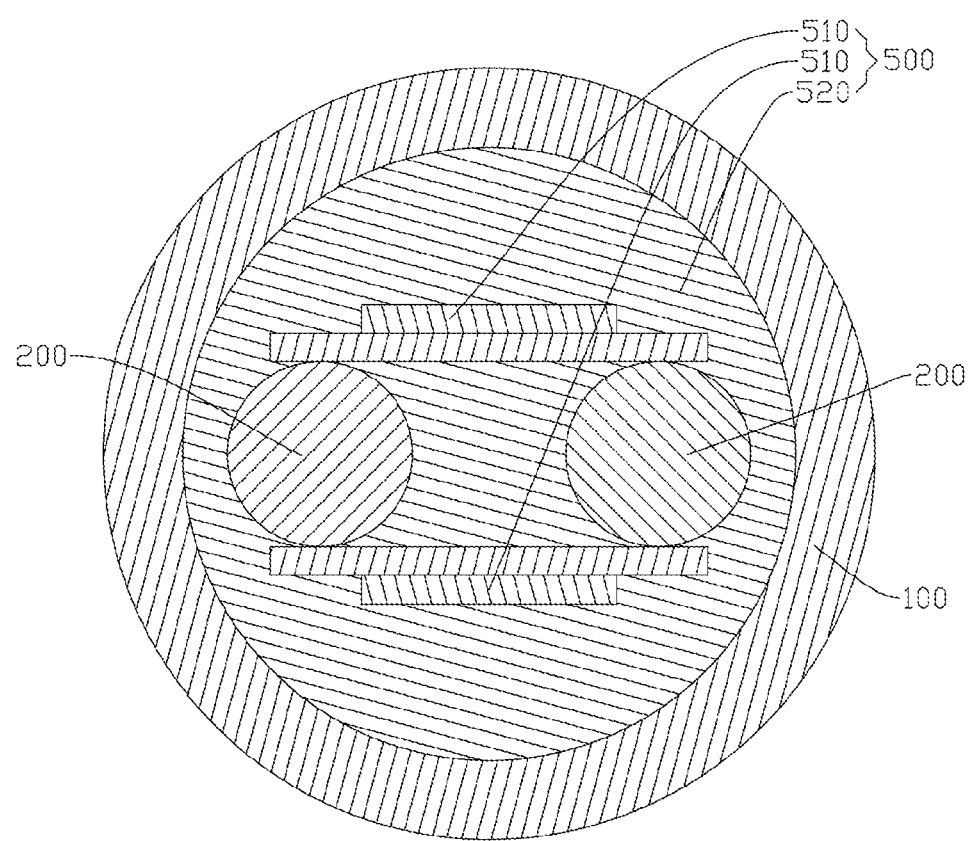
FIG. 3 is a sectional view of a flexible light transmitting insulation pipe at a light emitting device in an embodiment of the present disclosure.

As shown in FIG. 1 to FIG. 3, a line light emitting lamp string according to an embodiment of the present disclosure includes a flexible light transmitting insulation pipe 100; a power supply line group 200 arranged in the flexible light transmitting insulation pipe 100; at least one connecting piece 300, connected with the flexible light transmitting insulation pipe 100, the connecting piece 300 is provided with a conductive portion electrically connected with the power supply line group 200; a lamp body 400 detachably connected with the connecting piece 300 so that the lamp body 400 is electrically connected with the conductive portion; and at least one light emitting device 500 arranged in the flexible light transmitting insulation pipe 100 and electrically connected with the power supply line group 200.

The connecting piece 300 is connected with the flexible light transmitting insulation pipe 100, the conductive portion on the connecting piece 300 is electrically connected with the power supply line group 200 in the flexible light transmitting insulation pipe 100, the lamp body 400 is connected with the connecting piece 300 to enable the lamp body 400 to electrically connect with the conductive portion so that the lamp body 400 can obtain electric energy from the power supply line group 200 to emit light, the lamp body 400 is detachably connected with the connecting piece 300 so that the lamp body can be conveniently replaced and used, and thus it is conducive to maintain the lamp body 400 or replace other lamp bodies with different light emitting effects. Meanwhile, as the light emitting device 500 is arranged in the flexible light transmitting insulation pipe 100, the light emitting device 500 is connected with the power supply line group 200 to obtain electric energy. The flexible light transmitting insulation pipe 100 has the characteristics of light transmission, so that when being energized the light emitting device 500 and the lamp body 400 can emit light together to achieve a line light emitting effect. Without additionally increasing the quantity of connectors and lamp bodies 400, the density of luminous points can be improved, which is conducive to reducing the cost and meeting the use demands.

The flexible light transmitting insulation pipe 100 can be made of light transmitting resin, light transmitting plastic and other materials. The power supply line group 200 includes a positive pole power supply line and a negative pole power supply line.

Referring to FIG. 1 and FIG. 3, in some embodiments of the present disclosure, the light emitting device 500 includes at least one LED lamp bead 510 and a diffusion layer 520, the LED lamp bead 510 is connected with the power supply line group 200, the LED lamp bead 510 has a luminous surface covered by the diffusion layer 520, and the LED lamp bead 510 and the diffusion layer 520 are surrounded by the flexible light transmitting insulation pipe 100.

The LED lamp bead 510 is connected with the power supply line group 200. When the power supply line is powered on, the lamp bead 510 emits light, and the luminous surface of the LED lamp bead 510 is covered by the diffusion layer 520, so that the LED lamp bead 510 emits light more evenly, which is conducive to preventing a glare problem caused by the excessive concentration of the light of the LED lamp bead 510.

The diffusion layer 520 can be made of light transmitting adhesive and diffusion powder. During production, the LED lamp bead 510 can be welded with the power supply line group 200 firstly, the diffusion layer 520 is covered on the LED lamp bead 510, and then the flexible light transmitting insulation pipe 100 is wrapped around the power supply line group 200, the LED lamp bead 510 and the diffusion layer 520 through injection molding or extrusion.

Referring to FIG. 3, in some embodiments of the present disclosure, the light emitting device 500 includes two LED lamp beads 510, the two LED lamp beads 510 have luminous surfaces arranged by facing away from each other, and the two LED lamp beads 510 are surrounded by the diffusion layer 520.

The light emitting device 500 includes two LED lamp beads 510. The luminous surfaces of the two LED lamp beads 510 are arranged by facing away from each other. The two LED lamp beads 510 are surrounded by the diffusion layer, so that the two LED lamp beads 510 can form a luminous point that emits light in an all-round direction when the LED lamp beads 510 emit light, which is suitable for the installation and fixation of the lamp string. During the installation and fixation process, the luminance of the luminous point with the light emitting device 500 will not change obviously even if the flexible light transmitting insulation piece 100 is twisted, which is conducive to improving the light emitting effect of the light emitting device 500 to meet the use demands.

Referring to FIG. 1, in some embodiments of the present disclosure, at least three connecting pieces 300 are provided, a plurality of light emitting devices 500 are arranged between two adjacent connecting pieces 300, and the light emitting devices 500 between the adjacent connecting pieces 300 are arranged in an even way.

The light emitting devices 500 are arranged between the two adjacent connecting pieces 300. the plurality of light emitting devices 500 are arranged in the even way, which is conducive to making the density of the luminous points more evenly when the light emitting devices 500 emit light, and making the luminous brightness more evenly, so as to improve the light emitting effect.

Referring to FIG. 2, in some embodiments of the present disclosure, the connecting piece 300 includes a housing 310 and a conductive piece 320, the housing 310 is provided with an inner cavity, a first connecting hole 311, a second connecting hole 312 and a lamp body connecting hole 313, the first connecting hole 311, second connecting hole 312 and lamp body connecting hole 313 are communicated with the inner cavity, the conductive piece 320 is arranged in the inner cavity, the flexible light transmitting insulation pipe 100 passes through the first connecting hole 311, the inner cavity and the second connecting hole 312, the housing has a wall surface forming the first connecting hole 311 and a wall surface forming the second connecting hole 312, the wall surface forming the first connecting hole 311 and the wall surface forming the second connecting hole 312 are connected with the flexible light transmitting insulation pipe 100 in a sealing way, the conductive piece 320 is connected with the power supply line group 200, the conductive portion is arranged on the conductive piece 320, and the housing 310 has a wall surface forming the lamp body connecting hole 313 and detachably connected with the lamp body 400.

The flexible light transmitting insulation tube 100 passes through the first connecting hole 311, the inner cavity and the second connecting hole 312 in a proper order. The power supply line group 200 in the flexible light transmitting insulation tube 100 also passes through the first connecting hole 311, the inner cavity and the second connecting hole 312. The conductive piece 320 in the inner cavity is connected with the power supply wire group 200. The lamp body 400 is detachably connected with the wall surface forming the lamp body connecting hole 313. The lamp body 400 contacts the conductive portion of the conductive piece 320, so that the lamp body 400 is electrically connected with the power supply line through the conductive piece 320 to obtain electric energy. The wall surface forming the first connecting hole 311 and the wall surface forming the second connecting hole 312 are connected with the flexible light transmitting insulation pipe 100 in the sealing way, so that water is prevented from entering the inner cavity from the first connecting hole and the second connecting hole to achieve the water-proof effect, and thus the lamp string is suitable for outdoor use scenes and the reliability thereof is improved.

The conductive piece 320 is connected with the power supply line group 200, and an exposed opening can be arranged at the part of the flexible light transmitting insulation pipe 100 located in the inner cavity, so that the conductive piece 320 can be connected with the power supply line group 200 through the exposed opening; or the conductive piece 320 is provided with a needle part, and the needle part punctures the flexible light transmitting insulation pipe 100 to contact the internal power supply line group 200, so as to achieve the electrical connection between the conductive piece 320 and the power supply line group 200.

The housing 310 can be formed through injection molding. After the conductive piece 320 is connected with the power supply line group 200 in the flexible light transmitting insulation pipe 100, the housing 310 is formed through injection molding outside the conductive piece 320 and the flexible light transmitting insulation pipe 100, so that the wall surface forming the first connecting hole 311 and the wall surface forming the second connecting hole 312 are connected with the flexible light transmitting insulation pipe 100 in a sealing way; the housing 310 can also be formed through hot melt splicing of a first plastic piece and a second plastic piece. During the hot melt splicing process, the first plastic piece and the second plastic piece extrude the flexible light transmitting insulation pipe 100 to achieve the effect that the wall surface forming the first connecting hole 311 and the wall surface forming the second connecting hole 312 are connected with the flexible light transmitting insulation pipe 100 in a sealing way.

Referring to FIG. 2, in some embodiments of the present disclosure, the conductive piece 320 includes a first splicing block 321, a second splicing block 322 and a conductive threaded sleeve 323, the first splicing block 321 and the second splicing block 322 are located in the inner cavity, the first splicing block 321 is detachably connected with the second splicing block 322 to clamp the flexible light transmitting insulation pipe 100, the first splicing block 321 or the second splicing block 322 is provided with a conductive block 324 connected with the power supply line group 200, the conductive threaded sleeve 323 is connected with the wall surface forming the lamp body connecting hole 313, the lamp body 400 is provided with a conductive contact point capable of abutting against the conductive block 324 and a conductive threaded portion in threaded connection with the conductive threaded sleeve 323.

The flexible light transmitting insulation pipe 100 is clamped and fixed through a first splicing piece and a second splicing piece, and then the housing 310 is formed outside the first splicing piece and the second splicing piece through injection molding or hot melt splicing, and the conductive threaded sleeve 323 is connected with the wall surface forming the lamp body connecting hole 313 in the process at the same time. The flexible light transmitting insulation pipe 100 can be provided with an exposed opening, so that one power supply line of the power supply line group 200 in the flexible light transmitting insulation pipe 100 is connected with the conductive block 324, and the other power supply line of the power supply line group 200 is connected with the conductive threaded sleeve 323. On this account, after the conductive threaded portion of the lamp body 400 and the conductive threaded sleeve 323 are fixed in the threaded connection, the lamp body 400 contacts the conductive threaded sleeve 323 and the conductive block 324 so as to achieve the effect of the electrical connection with the power supply line group 200, which is conductive to installing and operating.

The conductive portion on the connecting piece 300 is formed by the conductive block 324 and the conductive threaded sleeve 323.

Figure 4:
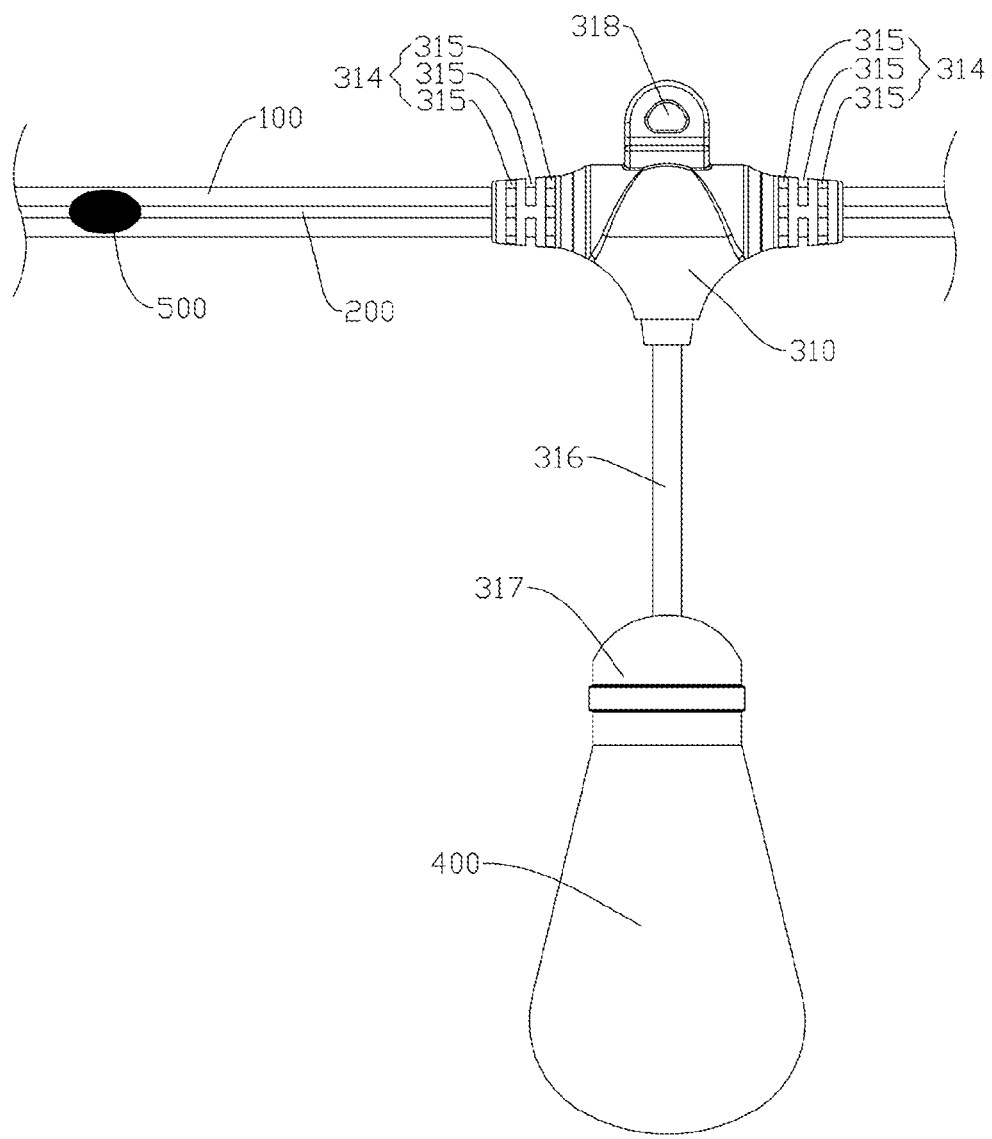
FIG. 4 is a structural schematic diagram of another embodiment of the present disclosure.

Referring to FIG. 2 and FIG. 4, in some embodiments of the present disclosure, a break-proof portion 314 is arranged on the wall surface forming the first connecting hole 311 and the second connecting hole 312, and the break-proof portion 314 can be bent along with the flexible light transmitting insulation pipe 100.

In the actual use process, due to the installation and fixation, the flexible light transmitting insulation pipe 100 is often bent and twisted. In such process, at the connection junction between the flexible light transmitting insulation pipe 100 and the housing 310, that is, the wall surface of the first connection hole and the wall surface of the second connection hole, if the housing 310 has a small rigid deformation and the flexible light transmitting insulation pipe 100 is bent, the wall surface of the flexible light transmitting insulation pipe 100 will generate large local pressure at the first connecting hole and the second connecting hole, and thus causing the flexible light transmitting insulation pipe 100 to break easily at this position. Therefore, a break-proof portion 314 is arranged on the wall surface forming the first connecting hole 311 and the wall surface forming the second connecting hole 312. The break-proof portion 314 can be bent along with the flexible light transmitting insulation pipe 100, so that a stress area of the flexible light transmitting insulation pipe 100 increases when being bent, which is conducive to reducing local pressure to avoid breakage and improving the reliability.

Referring to FIG. 2 and FIG. 4, in some embodiments of the present disclosure, the break-proof portion 314 includes at least two mutually parallel distortion grooves 315 arranged on the housing 310.

At least two mutually parallel distortion grooves 315 are respectively arranged on the wall surface forming the first connecting hole and the wall surface forming the second connecting hole. When the flexible light transmitting insulating tube 100 is bent, the wall surfaces of both sides of the distortion channel 315 are arranged close to or far from each other, so that the wall surface of the first connecting hole and the wall surface of the second connecting hole are bent along with the flexible light transmitting insulation pipe 100, and thus realizing the effect of reducing the breakage probability of the flexible light transmitting insulation pipe 100. The structure is simple and easy to implement.

The distortion groove 315 can be an arc groove or an annular groove arranged along the circumference of the first connecting hole or the circumference of the second connecting hole.

Referring to FIG. 4, in some embodiments of the present disclosure, the housing 310 is provided with an extending wire portion 316 and a connector portion 317, the extending wire portion 316 is provided with a hollow groove, the lamp body connecting hole 313 is positioned above the connector portion 317, the hollow groove has one end communicated with the inner cavity and another end communicated with the lamp body connecting hole 313.

The housing 310 is provided with an extending wire portion 316, and the extending wire portion 316 can be bent, so that the lamp body 400 can be detachably connected with the connector portion 317, which can achieve the effect of lifting the lamp body 400 and meet different decorative needs.

Referring to FIG. 2 and FIG. 4, in some embodiments of the present disclosure, the housing 310 has a wall surface of facing away from the lamp bod connecting hole 313 and provided with a hanging hole 318 thereon.

The housing 310 is provided with a hanging hole 318, and the hanging hole 318 can be conveniently hung on a fixed nail or a fixed column on the wall. After the wall surface of the lamp body connecting hole 313 is connected with the lamp body 400, since the hanging hole 318 and the lamp body connecting hole 313 are located at the opposite sides of the housing 310, the force on both sides of the housing 310 can be balanced, which is conducive to being more stable after installation.

Various technical features of the above embodiments can be arbitrarily combined. To make the description concise, all possible combinations of the technical features of the above embodiments are not described. However, as long as there is no contradiction exists in the combination of the technical features, the combination of the technical features should be considered as belonging to the scope of the specification.

Of course, the creation of the present disclosure is not limited to the above embodiments, and those skilled in the art can also make equivalent deformations or replacements without violating the scope of the present disclosure. These equivalent deformations or replacements all fall within the scope as defined by the claims of the present disclosure.

What is claimed is:

1. A line light emitting lamp string, comprising:
a flexible light transmitting insulation pipe;
a power supply line group arranged in the flexible light transmitting insulation pipe;
at least one connecting piece connected with the flexible light transmitting insulation pipe, wherein the connecting piece is provided with a conductive portion electrically connected with the power supply line group;
a lamp body detachably connected with the connecting piece, wherein the lamp body is electrically connected with the conductive portion; and
at least one light emitting device arranged in the flexible light transmitting insulation pipe, wherein the light emitting device is electrically connected with the power supply line group;

wherein the at least one connecting piece comprises a housing and a conductive piece, the housing is provided with an inner cavity, a first connecting hole, a second connecting hole and a lamp body connecting hole, the first connecting hole, second connecting hole and lamp body connecting hole are communicated with the inner cavity, the conductive piece is arranged in the inner cavity, the flexible light transmitting insulation pipe passes through the first connecting hole, the inner cavity and the second connecting hole, the housing has a wall surface forming the first connecting hole and a wall surface forming the second connecting hole, the wall surface forming the first connecting hole and the wall surface forming the second connecting hole are connected with the flexible light transmitting insulation pipe in a sealing way, the conductive piece is connected with the power supply line group, the conductive portion is arranged on the conductive piece, and the housing has a wall surface forming the lamp body connecting hole and detachably connected with the lamp body.

2. The line light emitting lamp string according to claim 1, wherein the light emitting device comprises at least one LED lamp bead and a diffusion layer, the LED lamp bead is connected with the power supply line group, the LED lamp bead has a luminous surface covered by the diffusion layer, and the LED lamp bead and the diffusion layer are surrounded by the flexible light transmitting insulation pipe.

3. The line light emitting lamp string according to claim 2, wherein the light emitting device comprises two LED lamp beads, the two LED lamp beads have luminous surfaces arranged by facing away from each other, and the two LED lamp beads are surrounded by the diffusion layer.

4. The line light emitting lamp string according to claim 1, wherein at least three connecting pieces are provided, and a plurality of light emitting devices are arranged between two adjacent connecting pieces, and the light emitting devices between the adjacent connecting pieces are arranged in an even way.

5. The line light emitting lamp string according to claim 1, wherein the conductive piece comprises a first splicing block, a second splicing block and a conductive threaded sleeve, the first splicing block and the second splicing block are located in the inner cavity, the first splicing block is detachably connected with the second splicing block to clamp the flexible light transmitting insulation pipe, the first splicing block or the second splicing block is provided with a conductive block connected with the power supply line group, the conductive threaded sleeve is connected with the wall surface forming the lamp body connecting hole, the lamp body is provided with a conductive contact point capable of abutting against the conductive block and a conductive threaded portion in threaded connection with the conductive threaded sleeve.

6. The line light emitting lamp string according to claim 1, wherein the wall surfaces forming the first connecting hole and the second connecting hole are provided with a break-proof portion, and the break-proof portion is capable of being bent along with the flexible light transmitting insulation pipe.

7. The line light emitting lamp string according to claim 6, wherein the break-proof portion comprises at least two mutually parallel distortion grooves arranged on the housing.

8. The line light emitting lamp string according to claim 1, wherein the housing is provided with an extending wire portion and a connector portion, the extending wire portion is provided with a hollow groove, the lamp body connecting hole is positioned above the connector portion, the hollow groove has one end communicating with the inner cavity and another end communicated with the lamp body connecting hole.

9. The line light emitting lamp string according to claim 1, wherein the housing has a wall surface facing away from the lamp bod connecting hole and provided with a hanging hole thereon.

* * * * *